Figure 1:
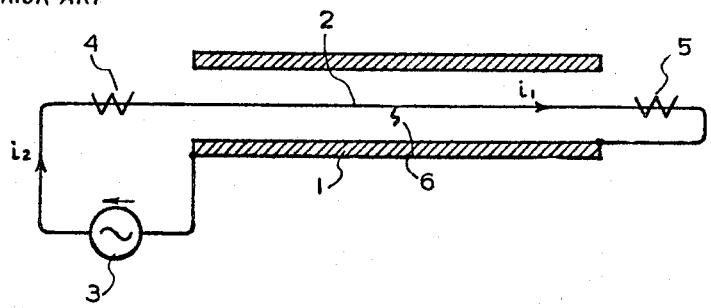

United States Patent

[11] 3,571,561

| [72] | Inventor | Masao Ando<br>Yokohamashi, Japan |
|---|---|---|
| [21] | Appl. No. | 805,480 |
| [22] | Filed | Mar. 10, 1969 |
| [45] | Patented | Mar. 23, 1971 |
| [73] | Assignee | Chisso Corporation<br>Osaka, Japan |
| [32] | Priority | Mar. 8, 1968 |
| [33] | | Japan |
| [31] | | 43/15081 |

[54] CIRCUIT FOR DETECTING ABNORMALITY IN ELECTRIC HEATING APPARATUS OF PIPE LINES
6 Claims, 5 Drawing Figs.

[52] U.S. Cl............................................................. 219/300,
317/27, 324/51
[51] Int. Cl............................................................. H05b 3/00
[50] Field of Search............................................. 219/300;
317/27; 324/51, 52

[56] References Cited
UNITED STATES PATENTS

| 1,727,585 | 9/1929 | Carleton..................... | 219/300UX |
| 1,884,444 | 10/1932 | West............................ | 317/27 |
| 2,561,249 | 7/1951 | Tomlinson.................. | 219/300UX |

*Primary Examiner*—R. F. Staubly
*Attorney*—Fred C. Philpitt

ABSTRACT: An abnormality-detecting circuit in a long electric heat-generating apparatus to be attached on pipelines which circuit is so arranged that abnormality can be detected by electrically dividing said heat-generating apparatus into two portions, supplying to each electrically divided portion of said heat-generating apparatus, voltages of the same phase, which are approximately proportional to the length of said divided portion so as to flow as equal a current through each divided portion as possible, and measuring the difference of the above-mentioned two currents which are normally set as equal as possible.

CIRCUIT FOR DETECTING ABNORMALITY IN ELECTRIC HEATING APPARATUS OF PIPE LINES

This invention relates to a circuit for detecting abnormality such as earthing due to the dielectric breakdown of the feeder in a long electric heating apparatus, e.g. a pipe line whose temperature is being maintained by electric heating, abnormal temperature change of a pipeline or the like.

When a liquid which has a high viscosity at normal temperature such as heavy fuel oil is to be transported by a pipeline, it is a common procedure to send it in the low viscosity state by elevating its temperature. Further, some means such as temperature maintaining means are generally provided for such a pipeline in order to prevent the temperature of the transporting liquid from being reduced.

According to Japanese Pat. No. 460,224 (Japanese Pat. Publication No. 12128/1965), the use of a tracing pipe or a heat generating pipe which utilizes skin effect of AC is proposed in the temperature maintenance and heating of a long distance pipeline. Hereinafter the heating method which utilizes a heat generating pipe by way of skin effect current will be abbreviated as "SECT method" (Skin Effect Current Tracing). The SECT method can be as also applied to electric heating apparatus for road surfaces, wall surfaces, etc. (e.g. see Japanese Patent Publication No. 16931/1968).

The detecting circuit of the present invention can be effectively applied in the above-mentioned SECT method but it can also be advantageously used generally in a long electric heat-generating apparatus.

Figure 2:
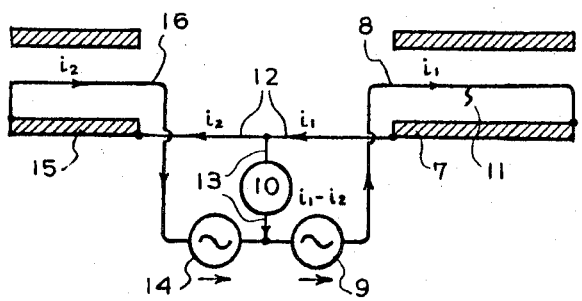
Figure 3:
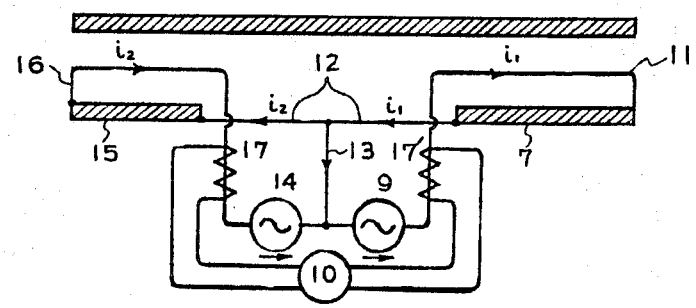
Figure 4:
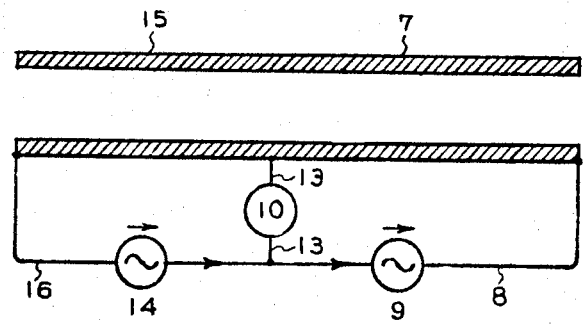
Figure 5:
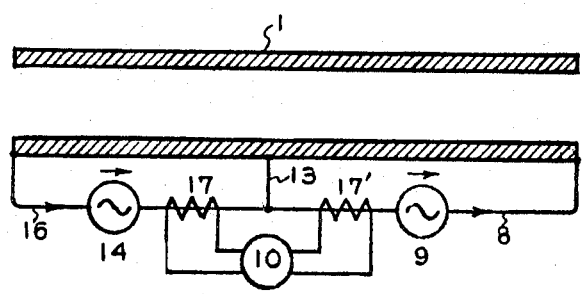

A preferred embodiment of the invention has been chosen for purpose of illustration and description and is shown in the accompanying drawings, forming a part of the specification, wherein FIG. 1 is a schematic diagram of a feeder circuit for a heat generating pipe used in a SECT method; FIG. 2 is a schematic diagram of one embodiment of the present abnormality detecting circuit attached to a heat generating pipe used in a SECT method; FIG. 3 is also a schematic diagram of another embodiment of the present abnormality detecting circuit attached to a heat generating pipe used in a SECT method; FIG. 4 is a schematic diagram of one embodiment of the present abnormality detecting circuit attached to an impedance heat-generating pipe; and FIG. 5 is a schematic diagram of another embodiment of the present abnormality detecting circuit attached to an impedance heat-generating pipe.

As seen in FIG. 1, the current supplied from AC source 3, flows through a circuit consisting of an insulated wire 2 installed within and passed through the inside space of a steel pipe 1 and the steel pipe 1. In this case, if a specified relationship is held between the dimensions of the steel pipe and the depth of the skin effect of the AC current the current is concentrated on the inner wall portion of the steel pipe and does not appear on the outer surface of the pipe. Accordingly, the steel pipe can not only be utilized as a heat-generating body, but also, when the steel pipe is welded to a liquid-transporting pipe, for example, a transporting pipe for heavy fuel oil, there is no fear that the current appears and flows in the liquid-transporting pipe. In FIG. 1, only the steel pipe as a heat-generating body is shown, and the liquid-transporting pipe to be heated is omitted.

As a detecting method for the case of current leakage due to an insulation abnormality 6 of the insulated wire 2 in FIG. 1, there is known, for example, a method which resorts to detecting the difference between current $i_1$ at a position 4 and current $\delta_2$ at a position 5, by installing current-detecting apparatuses respectively at two points and actuating a relay.

In this method, when the length of the steel pipe 1 is more than several hundred meters, the distance between the detecting apparatuses at 4 and 5 is remarkably increased. This not only makes accurate operation difficult, but is also uneconomical.

FIG. 2 shows a schematic view of the abnormality-detecting circuit according to the present invention in which the above-mentioned drawbacks are overcome. Heat-generating pipes 7 and 15 are those similar to the steel pipe 1 in FIG. 1, and are considered to be the pipe 1 electrically divided into two portions. Insulated wires 8 and 16 are installed within the inside spaces of the respective pipes 7 and 15. 9 and 14 are source transformers for the pipes 7 and 15 respectively.

A current-detecting apparatus 10 is connected as shown in the Figure, by wires 12 and 13 so that a current $i_1-i_2$ corresponding to the difference between the current $i_1$ at 8 and that $i_2$ at 16, flows therethrough. In order that the current $i_1-i_2$ can flow in the current-detecting apparatus 10, the voltage phases of the source transformers 9 and 14 must be the same, as shown by arrow marks. Further, as to the proportion of the lengths of the steel pipes 7 and 15, i.e. the position of the dividing point, there are many cases; for example, the length of the pipe 7 extends to several hundreds, and sometimes to several thousands of meters, whereas the length of the pipe 15 is about several meters or equal to that of 7. Whatever, the proportion may be, it is natural to determine the connecting wires from the source transformers 9 and 14 as short as possible. In addition, when these pipes are utilized, for example, as a heating apparatus for temperature maintenance of a pipeline, they are welded to the same liquid-transporting pipe. In order to make the current-detecting apparatus 10 as sensitive as possible, it is preferable to adjust the currents so as to give $i_1=i_2$. For that purpose, it would be sufficient to select the voltages from the source transformers 9 and 14 proportional to the lengths of the pipes 7 and 15 when the diameters and thicknesses of 7 and 15 are both equal. In a circuit thus constructed, if an insulation abnormality 11 occurs and equality of $i_1$ and $i_2$ is broken, a relay can be actuated by the current-detecting apparatus 10.

FIG. 2 is one embodiment of the circuit of the present invention where the current-detecting apparatus 10 is inserted in the conductor line 13 but there are other embodiments of the circuit of the present invention, for example the current-detecting apparatus 10 can be arranged as shown in FIG. 3 where 17 and 17' are current transformers inserted in the line 16 and the line 11 and the difference of the currents $i_1$ and $i_2$ flowing the divided parts can be likewise detected by the apparatus 10 placed in the circuit formed by 17, 10 and 17'. The other numericals of FIG. 3 are the same with those of the corresponding parts of FIG. 1.

Further, not only in a case of insulation abnormality, but also, for example, in case of abnormal elevation an abnormality in temperature can also be detected, since the electric resistances of the steel pipes are varied according to temperature and break the relationship of $i_1=i_2$.

It is not necessary to install two separate source transformers for each heat-generating pipe. A transformer can be used with such a construction that is secondary windings can supply two kinds of voltages which are proportional to the respective lengths of the steel pipes 7 and 15.

The abnormality-detecting circuit according to the present invention, can be applied not only to the heat-generating apparatus of the SECT method, but also to a heat-generating apparatus of the impedance method in which heat is generated by directly feeding current to a pipeline. In this case, the heat-generating pipes 7 and 15 constitute liquid-sending pipes, and the insulated wires 8 and 16 must be installed at the outside of the steel pipes.

FIGS. 4 and 5 show the abnormality-detecting circuits in case of impedance heat-generating method. Since the numerals of FIGS. 4 and 5 are the same as in FIGS. 1 and 2, there will be no detailed explanation. Since there is no need of a long distance connection, as in the detecting apparatus according to the publicly known method, for the abnormality-detecting apparatus according to the present invention, the longer the heat-generating apparatus is, the more economically advantageous the present abnormality-detecting circuit is, and also the far better detecting sensitivity can be obtained.

I claim:

1. An abnormality-detecting circuit for a long distance heat-generating apparatus inserted between two electrically divided first and second portions of said heat-generating apparatus comprising a first AC source, a conductor line connecting one end of the first AC source to the far end of the first divided portion of said heat-generating apparatus, the first divided portion of said heat-generating apparatus being a pipe, and a conductor line connecting the nearer end of the first divided portion of said heat-generating pipe to the other end of the first AC source, arranged in such order as to flow AC from the one end of the AC source, to the far end of the first divided portion of said heat generating pipe, then to the other end of the first AC source; a second AC source, a conductor line connecting one end of the second AC source to the nearer end of the second divided portion of said heat-generating apparatus, the second divided portion of said heat-generating apparatus being a pipe, a conductor line connecting the far end of the second divided portion of said heat-generating apparatus to the other end of the second AC source, arranged in such order as to flow AC from the one end of the AC source, to the nearer end of the second divided portion of said heat-gn heat-generating apparatus, then to the far end of the second divided portion of said heat-generating apparatus and further to the other end of second AC source, a part of the above-mentioned conductor line connecting one end of the second AC source to the nearer end of the second divided portion of said heat-generating apparatus forming the common conductor line with a part of the above-mentioned conductor line connecting one end of the first AC source to the near end of the first divided portion of said heat generating apparatus, and a current detecting apparatus inserted in the above-mentioned common conductor line so as to detect the difference of currents flowing through the first divided portion and the second divided portion.

2. A circuit according to claim 1 wherein both the conductor line connecting one end of the first AC source to the far end of the first divided portion and the conductor line connecting the far end of the second divided portion to the other end of the second AC source are passes through the inside of the respective portions of the heating apparatus.

3. A circuit according to claim 1 wherein both the conductor line connecting one end of the first AC source to the far end of the first divided portion and the conductor line connecting the far end of the second divided portion to the other end of the second AC source are provided at the outside of the respective portions of the heating apparatus.

4. An abnormality-detecting circuit for a long distance heat-generating apparatus inserted between two electrically divided first and second portions of said heat-generating apparatus comprising a first AC source, a conductor line connecting one end of the first AC source to the far end of the first divided portion of said heat-generating apparatus, the first divided portion of said heat-generating apparatus being a pipe, and a conductor line connecting the nearer end of the first divided portion of said heat-generating apparatus to the other end of the first AC source, arranged in such order as to flow AC from the one end of the AC source, to the far end of the first divided portion of said heat generating apparatus, then to the nearer end of the first divided portion and further to the other end of the first AC source; a second AC source, a conductor line connecting one end of the second AC source to the nearer end of the second divided portion of said heat generating apparatus, the second divided portion of said heat-generating apparatus being a pipe, a conductor line connecting the far end of the second divided portion of said heat-generating pipe to the other end of the second AC source, arranged in such order as to flow AC from the one end of the AC source, to the nearer end of the second divided portion of said heat-generating apparatus, then to the far end of the second divided portion of said heat-generating apparatus and further to the other end of the second AC source, a part of the above-mentioned conductor line connecting the one end of the second AC source to the nearer end of the second divided portion of said heat-generating apparatus forming the common conductor line with a part of the above-mentioned conductor line conductor line connecting the one end of the first AC source to the near end of the first divided portion of said heat-generating apparatus and a circuit for detecting difference of the current flowing in the first dividing portion and that of second divided portion consisting of a first current transformer whose primary side is inserted in the conductor line connecting the first AC source to the first divided portion, a current difference detecting apparatus and a second current transformer whose primary side is inserted in the conductor line connecting the second divided portion to the second AC source so as to flow current from the secondary side of the first transformer to the current difference detecting apparatus and further from the secondary side of the second transformer to the current difference detecting apparatus.

5. A circuit according to claim 4 wherein both the conductor line connecting one end of the first AC source to the far end of the first divided portion and the conductor line connecting the far end of the second divided portion to the other end of the second AC source are passed through the inside of the respective portions of the heating apparatus.

6. A circuit according to claim 4 wherein both the conductor line connecting one end of the first AC source to the far end of the first divided portion and the conductor line connecting the far end of the second divided portion to the other end of the second AC source are provided at the outside of the respective portions of the heating apparatus.